US006772267B2

(12) United States Patent
Thaler et al.

(10) Patent No.: US 6,772,267 B2
(45) Date of Patent: Aug. 3, 2004

(54) MULTI-PORTAL BRIDGE FOR PROVIDING NETWORK CONNECTIVITY

(75) Inventors: Thomas Thaler, Maennedorf (CH); Georg Dickmann, Duebendorf (CH); Thomas Boesch, Jona (CH); Christoph Heidelberger, Zurich (CH); Manfred Stadler, Zurich (CH); Marcel Dasen, Thalwil (CH)

(73) Assignee: BridgeCo AG, Duebendorf (CH)

( * ) Notice: Subject to any disclaimer, the term of this patent is extended or adjusted under 35 U.S.C. 154(b) by 423 days.

(21) Appl. No.: 09/784,831

(22) Filed: Feb. 16, 2001

(65) Prior Publication Data

US 2001/0037422 A1 Nov. 1, 2001

Related U.S. Application Data

(60) Provisional application No. 60/183,617, filed on Feb. 18, 2000, and provisional application No. 60/246,012, filed on Nov. 3, 2000.

(51) Int. Cl.[7] .................... G06F 13/42; G06F 15/173; H04L 7/00
(52) U.S. Cl. ........................ 710/306; 370/401
(58) Field of Search .................. 710/306, 62, 312, 710/72, 315, 316, 100; 709/250, 223, 200, 218, 249, 253; 370/401, 402, 465, 354, 466, 911, 912, 901, 908; 713/400

(56) References Cited

U.S. PATENT DOCUMENTS 5,610,905 A * 3/1997 Murthy et al.
5,963,556 A * 10/1999 Varghese et al.
6,098,110 A * 8/2000 Witkowski et al.
6,157,951 A * 12/2000 Vasa 6,560,222 B1 * 5/2003 Pounds et al.

OTHER PUBLICATIONS

"Enhancement to Audio and Music Data Transmission Protocol 1.0", TA Document 1999014, 1394 Trade Association, Santa Clara, California, U.S.A.; Jul. 10, 2000; 53 pages.
"Issues Related to Synchronization of Digital Media in IEEE 1394", Public E–mail Discussions of the Audio Engineering Society Standard Committee SC–06–02 Group, from Feb. 1, 1998 to Oct. 19, 1999; 113 pages.
"SMPTE Time Code and Sample Count Transmission Protocol Ver. 1.0", TA Document 1999024, 1394 Trade Association, Santa Clara, California, U.S.A.; Oct. 24, 2002; 22 pages.
A. Goldstein, "AES SC–06–02 Minutes Sep. 22, 2000", Meeting of the Audio Engineering Society Standards Committee; Sep. 22, 2000; 5 pages.

(List continued on next page.)

Primary Examiner—Gopal C. Ray
(74) Attorney, Agent, or Firm—Greenberg Traurig, LLP; Richard E. Kurtz, II; James E. Goepel

(57) ABSTRACT

Split IEEE 1394 bridges utilize individual portals or bundles of portals to communicate over a non-full-featured IEEE 1394 network such as a local or wide area network in combination with IEEE 1394 multi-portal bridges. Multi-portal bridges may be formed through the connection of several split bridges each with one or more IEEE 1394 portals over a core net. The core net is invisible to the IEEE 1394 nodes with respect to traffic originating from an IEEE 1394 bus for a destination in an IEEE 1394 bus, and the network elements allow for increased network scalability in both terms of physical size and levels of hierarchy. Useful properties of a core net such as availability of high-performance switches or increased reach are incorporated into an IEEE 1394 network.

18 Claims, 2 Drawing Sheets

OTHER PUBLICATIONS

J. Fujimori et al., "Digital Audio Transmission Over IEEE 1394: Protocol Design and Implementation", 103rd Audio Engineering Society Convention, New York, New York, U.S.A., Sep. 26, 1997; 7 pages and 12 figures; Preprint No. 4547, published by the Audio Engineering Society.

H. Kuribayashi et al., "A Supplement to Audio and Music Data Transmission Protocol over IEEE 1394":, 105th Audio Engineering Society Convention, San Francisco, California, U.S.A., Sep. 26, 1998; 5 pages and 8 figures; Preprint No. 4762, published by the Audio Engineering Society.

R. Laubscher et al., "A 1394–Based Architecture for Professional Audio Production", 109th Audio Engineering Society Convention, Los Angeles, California, U.S.A., Sep. 22–25, 2000; 9 pages; Preprint No. 5246, published by the Audio Engineering Society.

B. Moses et al., "Audio Distribution and Control Using the IEEE 1394 Serial Bus", 103rd Audio Engineering Society Convention, New York, New York, U.S.A.; Sep. 26, 1997; 18 pages and 6 figures; Preprint No. 4548, published by the Audio Engineering Society.

M. Poinboeuf, "Hierarchical Protocol and Process for Synchronization of Isochronous Transfers on the IEEE 1394 Bus for Professional Audio and Video Media Data Streams", Draft AES–X60 Standard Proposal, Revision 0.0; May 11, 1998; 2 pages.

J. Strawn, "Current Situation, Future Work", Public E–mail to the Audio Engineering Society Standard CommitteeSC–06–02 Group; Apr. 12, 2001; 5 pages.

"ContraNet, Inc. IEEE 1394 Presentation", Control Net, Inc.; Oct. 13, 1998; 22 pages.

R. Paripatyadar, "1394 Overview", ControlNet Inc.; Nov. 10, 1998; 19 pages.

* cited by examiner

MULTI-PORTAL BRIDGE FOR PROVIDING NETWORK CONNECTIVITY

CROSS-REFERENCE TO RELATED APPLICATIONS

This application is related to and claims priority from U.S. provisional application No. 60/183,617, filed Feb. 18, 2000, and to U.S. provisional application No. 60/246,012, filed Nov. 3, 2000, the specification of each provisional application being incorporated herein by reference.

FIELD OF THE INVENTION

The present invention relates generally to bridging between segments of communication networks. More particularly it relates to the extension of bridges between segments of IEEE 1394 type serial bus networks.

BACKGROUND OF THE INVENTION

In the prior art, an IEEE 1394 serial bus is capable of supporting only 63 nodes within one bus with all nodes sharing a common bandwidth resource, and in which any node generates bus resets affecting all other nodes. Inter-node distance is limited to a few meters in IEEE 1394a or several hundred meters in IEEE 1394b. The resulting limitation in scalability is partly alleviated by IEEE 1394 bridges segmenting an IEEE 1394 serial bus network into a maximum number of 1023 serial buses. The limited inter-node distance with a bus remains unaffected. A limitation to two-portal IEEE 1394 bridges may additionally lead to bandwidth bottlenecks within extended IEEE 1394 serial bus networks.

What is needed is an extension to IEEE 1394 serial buses that allows interconnection of IEEE 1394 serial buses over increased distances and improved scalability in terms of number of streams and/or bandwidth preserving the quality of service of native IEEE 1394 networks.

A different network technology known as Ethernet may provide improved connectivity. As described in an Oct. 13, 1998 presentation on IEEE 1394 by ControlNet, Inc. of Campbell, Calif.; Ethernet-compliant communications and packets may be transported over an IEEE 1394 network using ControlNet's "ETHERWIRE" product and technology. However, such Ethernet-related technology known in the art cannot transport IEEE 1394-compliant communications and packets over Ethernet/802.3 products. For example, advantageous features of IEEE 1394 such as quality of service (QoS) are not provided by Ethernet, if not complemented by other methods.

A need exists for a bridging technology which provides the advantages of IEEE 1394 as well as the capability to transport IEEE 1394 communications and packets over Ethernet technology and/or IEEE 802.3 technology, referred to herein generally as "Ethernet".

SUMMARY OF THE INVENTION

The present invention complements Ethernet technology to provide the advantageous features of IEEE 1394 technology, by introducing the new concept of split IEEE 1394 bridges in which individual portals or bundles of portals communicate over a non-full featured IEEE 1394 network such as a local or wide area network and combines this with the concept of IEEE 1394 multi-portal bridges. This non-IEEE 1394 network is referred to herein as a "core net". Multi-portal bridges may be formed through the connection of several split bridges each with one or more IEEE 1394 portals over a core net. The core net is invisible to the IEEE 1394 nodes with respect to traffic originating from an IEEE 1394 bus for a destination in an IEEE bus. This new type of network elements allows for increased network scalability in both terms of physical size and levels of hierarchy. Useful properties of a core net such as availability of high-performance switches or increased reach are thereby incorporated into an IEEE 1394 network.

The invention additionally supports, where applicable, traffic originating from the IEEE 1394 network to be routed to a destination within the core net and vice versa. Network configuration, traffic separation, ingress control and resource signaling are performed to maintain quality of service (QoS) levels as in an IEEE 1394 serial bus network and, for packets originating from the core net and traveling into the IEEE 1394 network and vice versa, the quality of service of the originating network is mapped onto corresponding services within IEEE 1394. The presence of different network and protocol types is hidden in the case of nodes communicating to nodes attached to a network of the same kind. Through the use of an appropriate adaptation protocol, for example dedicated framing and segmentation/reassembly, isolated nodes contained within one protocol domain are enabled to communicate to the other domain as if it was the same domain. The invention supports dynamic insertion and removal of bridge portals to/from the core net.

DETAILED DESCRIPTION OF THE PREFERRED EMBODIMENT

Figure 1:
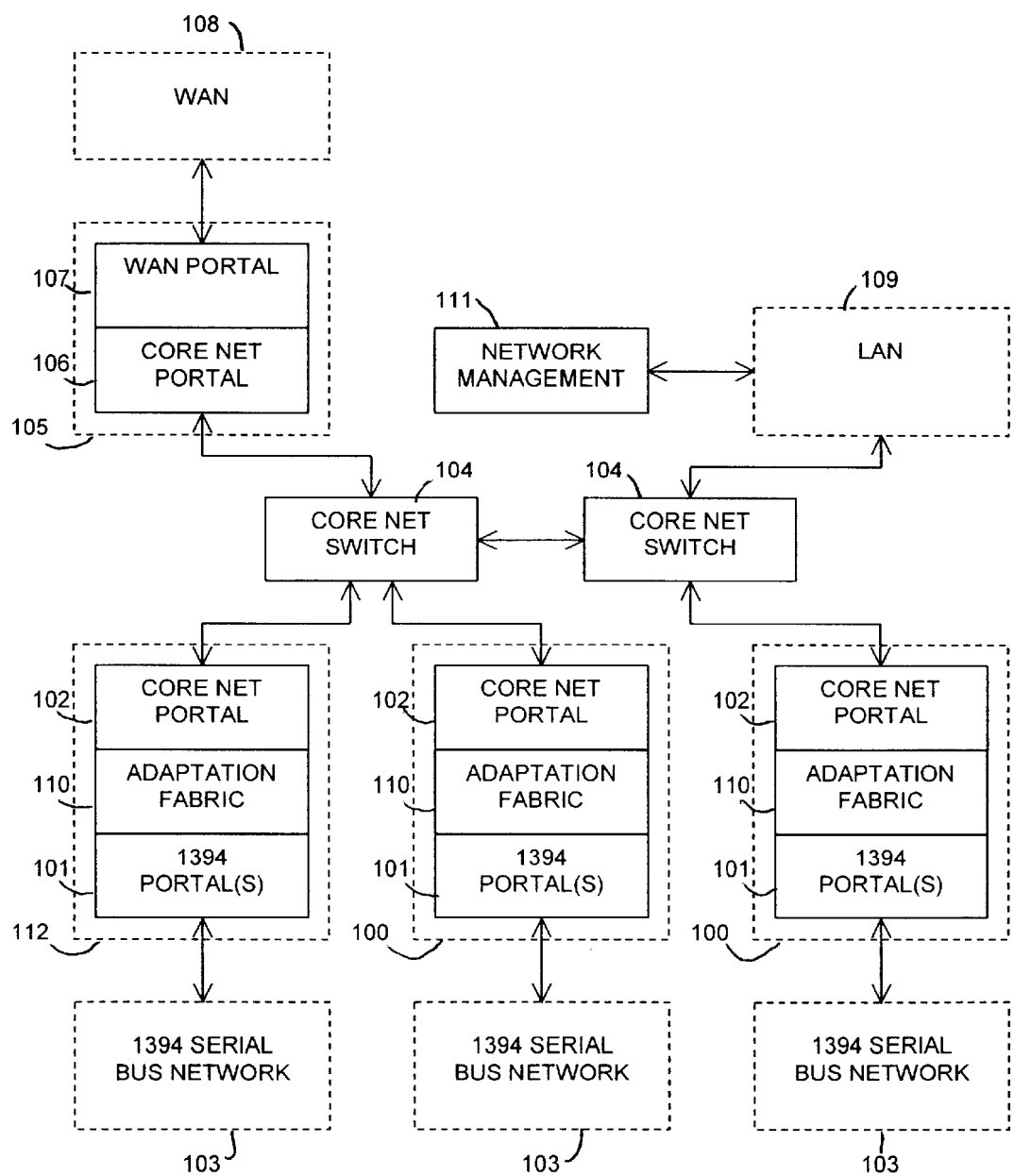
FIG. 1 illustrates the operating environment of an embodiment of the invention.

As shown in FIG. 1, the disclosed core net bridges 100, 112 link multiple IEEE 1394 type networks, sub-networks or buses 103 over non-IEEE 1394 networks and appropriate switches, routers, bridges or gateways 104. The combination of two or more core net bridges 100, 112 forms, from the perspective of the IEEE 1394 networks 103, two-portal or multi-portal portal IEEE 1394 bridges. This combination is referred to herein as a virtual multi-portal bridge, of which a virtual two-portal bridge is an example embodiment. As such, traffic between any portal is supported, whether they are serving as alpha portals or subordinate portals. Any core net bridge supports asynchronous traffic and, in a preferred embodiment, isochronous traffic. A single core net may simultaneously support multiple virtual bridges which belong to different IEEE 1394 networks by assignment of different VLAN tags to each of the virtual bridges or each individual IEEE 1394 network.

An IEEE 1394 network is designed to support traffic at different levels of quality of service (QoS), for example, isochronous and asynchronous traffic. Isochronous traffic is characterized by guaranteed transfer delay and guaranteed bandwidth based on a bandwidth reservation scheme as well as network inherent timing. This network inherent timing supports network-wide available time information, thereby enabling applications to provide synchronicity of single or continuous events. Time information is distributed by timing packets that are propagated in regular intervals and that undergo special handling, insuring timely propagation and update of time information within an IEEE 1394 network.

Asynchronous traffic provides a secure transfer of information through acknowledged packets. Packet loss or excessive packet delay may however occur for asynchronous traffic since bandwidth does not need to be reserved prior to packet transmission. A distinction is also made between local traffic bound to a single IEEE 1394 serial bus and traffic traversing network devices linking different IEEE 1394 serial buses. An IEEE 1394 network may simultaneously provide different nominal transmission speeds depending on the transmission path, the packet type and the particular nodes participating in a transmission. Also, the size of packets traveling in the network is variable.

In one preferred embodiment, the core net is an Ethernet-based device or application, using Ethernet-switches as the core net switches 104. In another preferred embodiment the core net is an IEEE 802.3 network. It may, in further embodiments, be based on multi-protocol label switching (MPLS), and/or combinations of different networking protocols and technologies. Any of the two technologies known as Ethernet and IEEE 802.3 are referred to herein generally as "Ethernet".

One preferred embodiment of the core net bridges 100, 112 include, functionally, an IEEE 1394 part 101 and a core net part 102 with an adaptation fabric 110 in between. The IEEE 1394 part 101 consists of one or more IEEE 1394 bridge portals each being represented by one or more IEEE 1394 serial bus ports. In one preferred embodiment, each portal 101 implements the full set of resources required by an IEEE 1394.1 bridge portal. Inter-portal connectivity between two or more IEEE 1394 portals and between core net and IEEE 1394 portals is contained within the adaptation fabric 110. The core net portal 102 includes one or more core net interfaces. Multiple core net interfaces may be used for trunking or link aggregation. Components of the adaptation fabric 110 are illustrated in greater detail in FIG. 2. The serial bus portals 101 are connected to IEEE 1394 serial bus networks 103 with all connected networks 103 together forming a single logical IEEE 1394 network or multiple interconnected IEEE 1394 networks. The core net portals 102 are connected to one or more core net switches 104 through, for example, Gigabit or Fast Ethernet. The core net switches are connected directly to associated applications or devices by further core net switches or by a third network type, as well as implementing the interconnection of multiple core net switches.

The core net switches may also be connected to one or more Local Area Networks (LAN) 109 or, using a Wide Area Network (WAN) interface 105 including at least one core net portal 106 and one WAN portal 107, to a Wide Area network 108. The core net portal 102 or the core net switch 104 may alternatively be directly connected to a WAN 108. Further WAN interfaces may be incorporated into the network to provide connectivity between IEEE 1394 networks 103 over a WAN 108. The location of a central or distributed network management unit 111 for remote configuration is arbitrary. It may also be incorporated within one or more core net bridges 100, 112.

Figure 2:
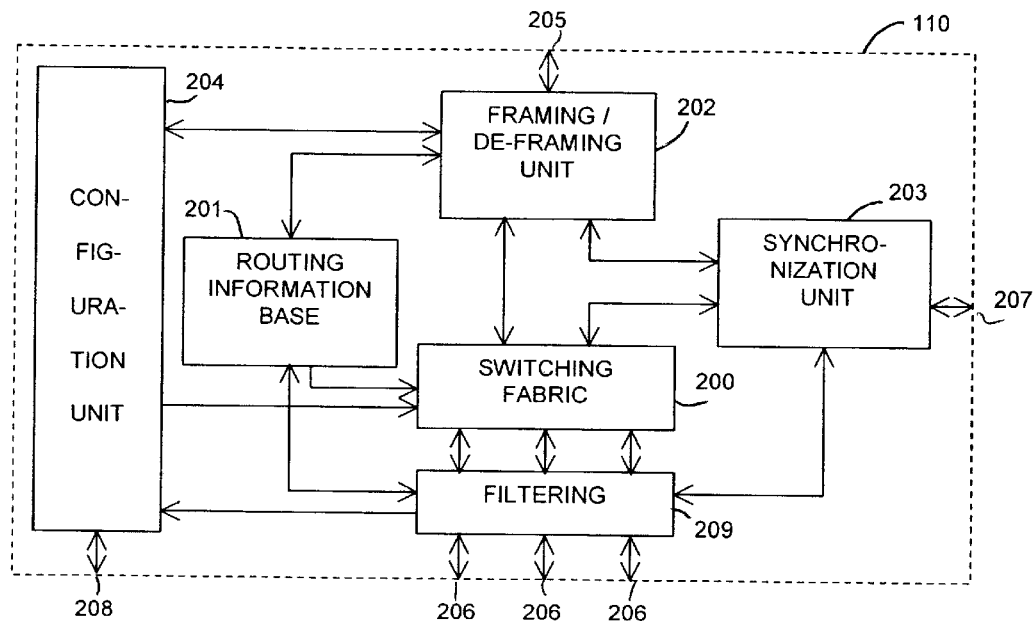
FIG. 2 illustrates in more detail an adaptation fabric.

The adaptation fabric is illustrated in more detail in FIG. 2. The switching fabric 200 provides any routes between IEEE 1394 portals 206, a core net portal 205, and an interface 207 to a synchronization unit 203. The required routing information is held or distributed by the routing information base or database 201. It is extracted from IEEE 1394 bridge portals 206, routing information contained within the payload and/or management traffic and from configuration information held in a configuration unit 204. The synchronization unit 203 ensures the maintenance of IEEE 1394 serial bus synchronization across the core net as well as the synchronization between multiple IEEE 1394 buses attached to one core net bridge. It additionally provides the options of synchronization onto an external synchronization input as well as the provision of a synchronization signal to external devices.

In one embodiment, an external synchronization input could be used to connect to a global positioning system (GPS) synchronization source or a synchronization signal issued by another core net bridge to support the timing required by an IEEE 1394 network over a core net that does not provide for the transport of timing information. In one embodiment, the synchronization unit 203 in one core net bridge 112 transmits timing information within timing packets to all other core net bridges 100 that are connected to the same switch 104 or set of switches 104. The core net bridges 100 extract the timing information via their synchronization units 203 and forward this timing information to the IEEE 1394 serial bus networks 105.

In a preferred embodiment, this forwarded timing information relies on the IEEE 1394-inherent cycle master synchronization and, as such, does not require the transmission of information beyond what is required for timing and/or cycle master synchronization in an IEEE 1394 network.

In one embodiment timing packets are given superior priority to other packets to ensure minimum latency over the core net. In another embodiment, the core net bridge receiving timing packets additionally observes the arrival time and the length of packets that have been received just before a timing packet to estimate the load-dependent latency of the timing packet over the core net or to segregate timing packets with a likelihood of being delayed on their way through the core net. Also, the core net latency is measured by observing the roundtrip delay of packets over the core net between core net bridges. The measured latency is then compensated for in order to achieve phase alignment between the IEEE 1394 networks 103.

Figure 3:
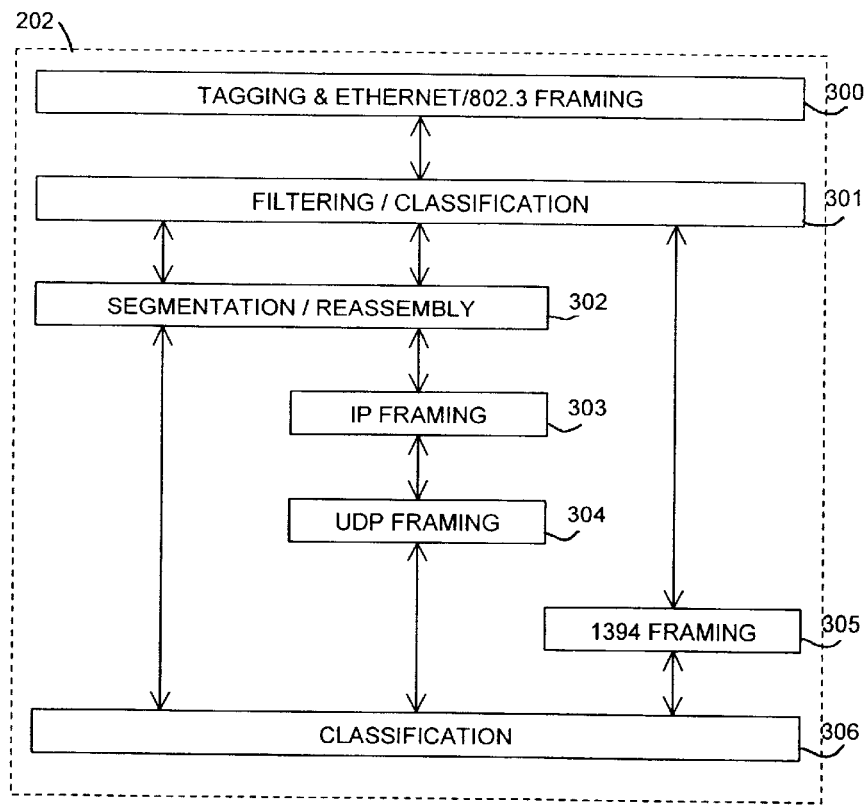
FIG. 3 illustrates in more detail a framing/de-framing unit.

A framing/de-framing unit 202 performs the conversion of packets between different protocol domains or the encapsulation of a packet from one protocol domain within frames as required by the other domain as illustrated in more detail in FIG. 3. The configuration unit 204 performs both automated configuration and manual configuration obtained from a local or remote management unit.

Remote management information is collected from any data path, and local management information is provided through a management interface 208. Configuration tasks include automated connection management for dynamic insertion and removal of core net bridges to the core net, provision of appropriate IEEE 1394 net update information over the core net, allocation of bandwidth resources for isochronous streaming across the core net and the set-up of a mapping between different service quality levels provided by IEEE 1394 and, for example, tagged Ethernet with VLAN tagging.

The allocation of bandwidth resources for isochronous streams involves the reservation of bandwidth. The set-up or tear-down process for isochronous streams which are to be transported across the core net is accompanied with the addition or deletion of entries in one or more bandwidth reservation tables held and/or stored in memory in the core net bridges 100, 112 and/or a central management unit 111. The availability of bandwidth limits the number and size of entries in these reservation tables, so bandwidth allocation is governed by the properties and load of the core net. The bandwidth allocation process may include the utilization information about topology and/or internal structure of the core net.

A distributed or central table of the members of the virtual multi-portal bridge supports dynamic insertion or removal of bridge portals. This table may be stored in memory within a network management unit 111 and/or the configuration unit 204. In one preferred embodiment, the management of dynamic insertion and removal of core net bridges involves the auto-configuration of addresses by a dynamic host configuration protocol (DHCP) as well as a broadcast message issued by the newly inserted core net bridge which informs other core net bridges about the changed topology. This topology information is held within one or several core net bridges by a regular exchange of information, and thus performing the detection of the removal of core net bridges.

The simultaneous flow of data from one source to several destinations as supported by isochronous streaming within the IEEE 1394 serial bus is, in one embodiment, mapped onto multicasting processing within the core net. On a per stream basis, the units 111 and/or 204 provide multicast addresses. The General Attribute Registration Protocol (GARP) Multicast Registration Protocol (GMRP), as defined in the IEEE 802.1d specification and/or the Internet Group Multicast Protocol (IGMP), known in the art, are used to process the joining or leaving of core net bridges of a multicast group. A filtering block 209 allows the interception or monitoring of specific packets required for the operation or management of the core net bridge.

As shown in FIG. 3, the framing/de-framing block 202 is subdivided in stages 300 through 306 providing different handling procedures for different types of traffic and providing layer-by-layer packet processing. In one embodiment, the block 300 performs tagged Ethernet framing/de-framing according to IEEE 802.1d/q. Virtual LAN (VLAN) priority levels are mapped onto different packet types for packets originating from an IEEE 1394 bus, namely timing relevant packets, isochronous stream packets, asynchronous control packets, other asynchronous packets and Internet protocol (IP) packets. A subsequent filtering/ classification stage 301 directs traffic to the appropriate framing/de-framing stages. IEEE 1394 packet header information may be maintained and/or restored across the core net, or it may be stripped by the framing/de-framing stage and replaced by another header after traversing the core net.

Differing constraints on packet size imposed by either the core net or the IEEE 1394 serial bus are handled within a segmentation and reassembly block 302. Segmentation and reassembly includes the allocation of sequence numbers. Traffic may either be further encapsulated in IP frames by block 303 and transmission control protocol (TCP) or user datagram protocol (UDP) frames in block 304 or directly forwarded to the classification stage 306. The unit 305 handles IP packets that need to be encapsulated in IEEE 1394 packets as, for example, provided in the Network Working Group RFC2734 specification. The classification unit 306 maps IEEE 1394 traffic to the appropriate framing/ de-framing chain.

In one embodiment the framing/de-framing unit 202 includes an error detection stage or forward error correction stage optionally depending on the bit error rate within the core net. In a further refinement of this embodiment or an alternative embodiment, the service quality level of the core net, as, for example, given by a bit error rate or packet loss rate, governs a retransmission and/or forward error correction scheme trading an increase of latency as caused by the error detection and/or correction schemes against an improvement of error or packet loss rate. This scheme may be selectively applied to different types of traffic such as isochronous, asynchronous, timing or inter bridge-portal messages.

Maintenance of the different levels of quality of service, as provided by the IEEE 1394 network across the core net is provided by traffic engineering methods as performed within the blocks 209, 301 and 306. The traffic engineering relies on traffic separation, for example into asynchronous-, isochronous-, management- and timing traffic, ingress control, i.e. the control of the quantity of each type of traffic that is forwarded from the IEEE 1394 network onto the core net and resource signaling as is done, for example, by VLAN priority levels. In one embodiment, the traffic engineering includes traffic shaping for the minimization of packet loss, optimization of throughput and latency. The traffic engineering additionally includes management and/or configuration of a switch or several switches within the core net such that, for example, priority levels of VLAN tagging match the requirement of the core net bridge.

What is claimed is:

1. A multi-portal bridge for providing network connectivity, the multi-portal bridge comprising:
    a plurality of split bridges, with each split bridge including a first type of portal;
    and a network connected to the plurality of split bridges, wherein the network includes a second type of portal and a synchronization unit for performing bus synchronization across and between the network and the plurality of split bridges.

2. The multi-portal bridge of claim 1, wherein the first type of portal is IEEE 1394-compliant.

3. The multi-portal bridge of claim 1, wherein the second type of portal is Ethernet-compliant.

4. The multi-portal bridge of claim 1, wherein at least one split bridge of the plurality of split bridges includes a first node associated with the first type of portal; wherein the network includes a second node associated with the second type of portal; and wherein communication signals are transmitted between the first and second nodes over the plurality of split bridges and the network.

5. The multi-portal bridge of claim 1, wherein the network, connected to the plurality of split bridges, provides quality of service (QoS) associated with the first type of portal.

6. The multi-portal bridge of claim 5, wherein the network transmits communications signals to a first split bridge of the plurality of split bridges; and wherein a QoS of the network is provided to the first split bridge receiving the communications signals.

7. The multi-portal bridge of claim 6, wherein the communications signals are packets.

8. The multi-portal bridge of claim 1, wherein the network is an adaptation fabric providing inter-portal connectivity between the plurality of split bridges with each other and with an external network having the second type of portal.

9. The multi-portal bridge of claim 8, wherein the external network is a Ethernet-based network.

10. A system comprising:
    a first network operating using a first type of communications protocol;
    a second network operating using a second type of communications protocol different from the first type of communications protocol;
    and a split bridge having:
        a first portal, connected to the first network, for conveying communications using the first type of communications protocol;
        a second portal, connected to the second network, for conveying communications using the second type of communications protocol; and a synchronization unit for performing synchronization across and between the networks and the split bridge.

11. The system of claim 10, further comprising: a switch, connected to the second network, for receiving the communications from the first network via the split bridge.

12. The system of claim 10, wherein the first type of communications protocol is an IEEE 1394-based protocol.

13. The system of claim 10, wherein the first type of communications protocol is an Ethernet-based protocol.

14. The system of claim 10, wherein quality of service (QoS) is maintained for communications between the first and second networks using the first and second types of communications protocols, respectively.

15. A method for providing communications over different types of networks, the method comprising the steps of:

transmitting a communications signal from a first network to a bridge unit using a first type of communications protocol to a bridge unit;

receiving the communications signal at a first portal of the bridge unit, the first portal being compliant with the first type of communications protocol;

converting the communications signal from the first type of communications protocol to a second type of communications protocol different from the first type, including performing framing/de-framing operations on the communications signal using a framing/de-framing unit for selective processing of the communications signal according to the format of the communications signal;

transmitting the converted communications signal from a second portal of the bridge unit, with the second portal being compliant with the second type of communications protocol; and receiving the converted communications signal at a second network using the second type of communications protocol.

16. The method of claim 15, wherein the first type of communications protocol is an IEEE 1394-based protocol.

17. The method of claim 15, wherein the first type of communications protocol is an Ethernet-based protocol.

18. The method of claim 15, wherein each of the steps of transmitting, receiving, and converting includes the step of: maintaining quality of service (QoS) of the communications signal for transmission and reception by the first and second networks, respectively.

* * * * *